United States Patent
Karpinski, Jr.

(10) Patent No.: US 6,229,615 B1
(45) Date of Patent: May 8, 2001

(54) AUTOMATIC DITHER PICKOFF GAIN SELECT

(75) Inventor: Andrew J. Karpinski, Jr., Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/478,317

(22) Filed: Jan. 6, 2000

(51) Int. Cl.$^7$ ................................................. G01C 19/68
(52) U.S. Cl. .................................................. 356/475
(58) Field of Search ................... 356/472, 474, 356/475

(56) References Cited

U.S. PATENT DOCUMENTS 4,243,324 * 1/1981 Friedland .............................. 356/475
4,255,054 * 3/1981 Freidland .............................. 356/475

* cited by examiner

Primary Examiner—Samuel A. Turner
(74) Attorney, Agent, or Firm—Robert E. Greenstien

(57) ABSTRACT

In a ring laser gyro (RLG), the dither pick off signal is applied to a variable gain amplifier, producing an output that controls the amplitude of the motion of a dither motor connected to the gyro. A square wave is generated from the dither pick off signal and applied to a signal processor with clockwise and counterclockwise signals produced by the motion of the gyro. The signal processor controls a multiplexer to select the gain for the variable gain amplifier by counting the clockwise and counterclockwise signals produced by the gyro motion in a interval (number of whole periods of dither motion) determined by counting the square wave signal produced from the dither pick off signal.

5 Claims, 2 Drawing Sheets

AUTOMATIC DITHER PICKOFF GAIN SELECT

FIELD OF THE INVENTION

This invention relates to ring laser gyros (RLG), in particular techniques for controlling the dithering of RLGs.

BACKGROUND

It is known that the two laser beams in a ring laser gyro will lock on to each other if their frequency difference is too low, a condition that can occur at low input (rotation) rates, rendering the gyro (RLG) unable to detect low angular input rates. To eliminate this problem, a gyro can be mechanically modulated ("dithered") a small amount by a dither motor.

An electric motor drive, such as a piezoelectric transducer operating on a torsion spring to which the gyro is mounted, may be used to dither the gyro and a similar transducer (dither pickoff) can be attached to the gyro to detect the dither motion as part of closed loop dither control to sustain spring oscillation at a desired amplitude that does not interfere with gyro operation.

In practice, however, the level of the signal seen at the dither pick off for a given dither level, known as the gain of the dither pickoff, can vary significantly between RLGs. Therefore, the same dither control electronics may not provide the same performance from one RLG to another. A manual way to use the same the basic electronics for all RLGS but customize the operation to each gyro for its dither pickoff gain can include using resistor or capacitor divider network to vary the gain of an amplifier producing the dither pickoff that is used to control the motor drive.

SUMMARY OF THE INVENTION

An object of the present invention is to provide an improved technique for using the same dither electronics with different RLGs without the manual step of adjusting the gain.

According to the invention, the dither pick off is applied to an amplifier that controls the dither motor and the amplifier gain is varied as function of the gyro optical rate readout amplitude.

In the prior art, a gyro optical readout produces separate signals for clockwise (CW) and counterclockwise (CCW) motion. According to the invention these clockwise (CW) and counterclockwise (CCW) signals are counted up for an interval defined by a clock signal to produce a count C1 within a defined period. The output from the dither amplifier is applied to a comparator to produce a signal that drives a counter which on reaching a selected value or count produces the clock signal, defining the defined period. The gain of the amplifier is selected between a plurality of values by a gain count, which is incremented if C1 is less than a stored minimum and decremented if C1 is greater than a stored maximum. If it is neither, the operation of the gain select is inhibited and the gain is not changed.

According to one aspect of the invention, if the frequency of the motion quadrature signals is too high the gain select process is aborted A feature of the invention is that if the CW and CCW signals are counted for a period that is exactly a integer multiple of the dither motion period, the filtering of gyro external motion is much more effective and the time period does not have to be as long. In fact, if there were no random noise modulation, which is present in all practical dithered RLGs, only exactly one dither period would be required to filter out the external motion. Waiting for multiple dither periods can be done to filter out the random noise modulation.

Other objects, benefits and features of the invention will be apparent from the following discussion of one or more embodiments.

DETAILED DESCRIPTION

Figure 1:
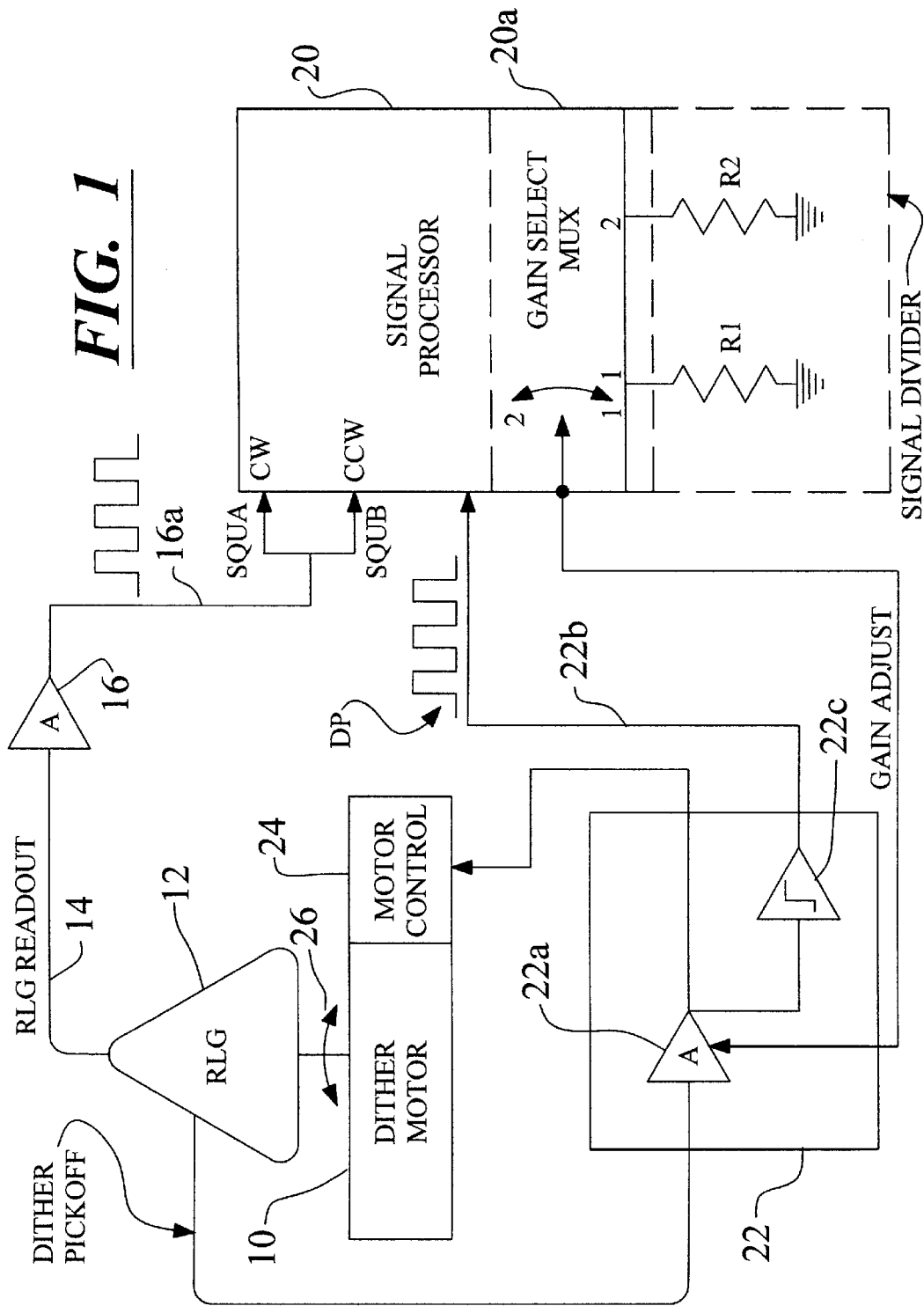
FIG. 1 is a block diagram showing an RLG and a dither control embodying the present invention.

Referring to FIG. 1, a dither motor 10 is mechanically connected to an RLG 12 that produces an output on line 14 which is connected to the input of an amplification and signal processing circuit 16 (known in the art) to produce a pair of square wave signals SQU A, SQU B that indicate the direction, either CW or CCW, by the RLG 12. Those signals are inputs to a signal processor 20 that includes a multiplexer 20a. A dither pickoff signal from the RLG 12 is supplied to a second amplification and signal processing circuit 22, and one output from this circuit is an input to a dither motor control circuit (known in the art) from an amplifier 22a to the dither motor control 24. This provides close loop control of the dither motor to control the magnitude of the dither motion 26, and according to the invention, the gain that amplifier 22 can vary between a plurality of values, in this example, two values 1 and 2, by the selective operation of the multiplexer (MUX) 20a by the signal processor 20. Another output from the processing circuit 22 is a square wave DPS on the output line to 22b from a comparator 22c. The multiplexer 20a controlled by the signal processor to select one of two signal 1,2 consisting of resistance R1, R2. Instead of these divider circuits other devices can be selected to change the gain of amplifier to 22a.

Figure 2:
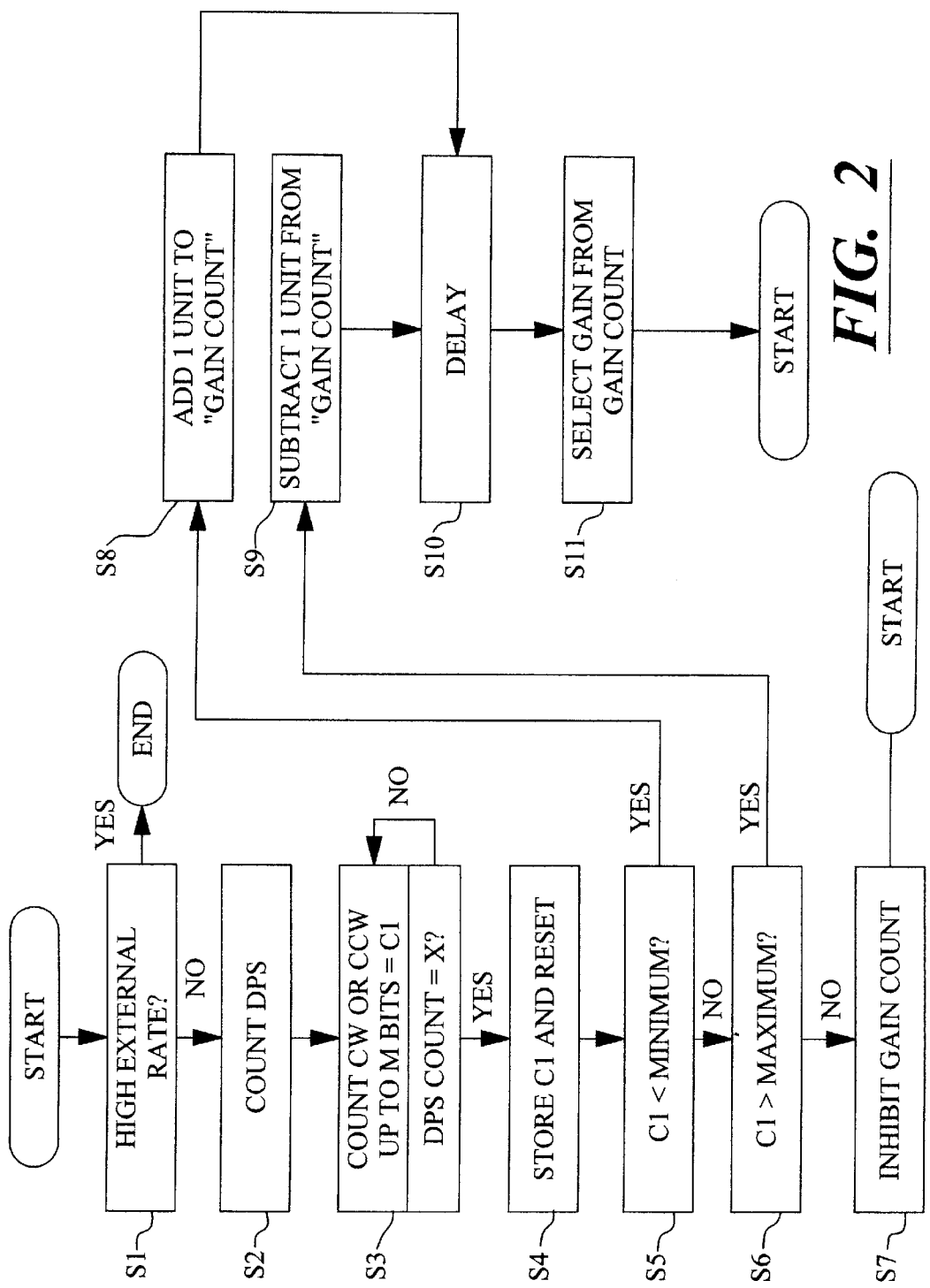
FIG. 2 is a flow chart showing steps for carrying out the invention.

FIG. 2 demonstrates the processing implemented by the signal processor 20 according to the present invention to select one of the two signal dividers 1,2. At the very beginning in step S1, the test is made of the frequency or rate of the SQUA and SQUB. If this rate, the frequency of the square wave on line 16a, is above the smallest expected peak dither rate the gain adjust process ends. Assuming a negative answer, the process moves to step S2, which counts the number of pulses in the DPS signal. In step S3, the number of pulses on the line 16a is counted as count C1 in a counter with a depth of M bits for the time that it takes the DPS count to equal X. When the DPS count equals X, the value for C1 is stored and then the M bit counter is reset. Steps S5 and S6 are tests that are performed on the stored count C1. If the stored count Cl in step S5 is less than a stored "minimum" value, the affirmative answer initiates step of S8, recalling a running "gain coun" to which one unit is added. If the value of C1 is not less than that minimum value the resulting negative answer leads to step S6 which tests if C1 is greater than a "maximum" value, and an affirmative answer at step S6 initiates step S9, subtracting one unit from the "gain count". If negative answers are produced at both steps S5, S6, the gain count is inhibited, maintaining the current gain level for amplifier 22a by maintaining the existing MUX selection. After a delay, step S10, the signal processor commands the MUX 20a to select one of the gain positions 1,2 as a function of the current gain count.

It can be appreciated from the above that if the CW and CCW signals are counted for a period that is exactly a integer multiple of the dither motion period (X above), the filtering of the external motion is much more effective and the time period does not have to be as long. In fact, if there were no random noise modulation, which is present in all practical dithered RLGs, only exactly one dither period would be required to filter out the external motion. Waiting for multiple dither periods is done to filter out the random noise modulation.

From the above explanation of the invention one of ordinary skilled in the art may be able to make modifications, in whole or in part, to the apparatus, components and functions without departing from the true scope of end spirit of the invention.

What is claimed is:

1. A gyro comprising:

a motor connected to a ring laser gyro to dither the ring laser gyro;

a dither pick-off connected to the ring laser gyro;

a variable gain amplifier that receives a dither pick off signal from said dither pick off to produce a signal that controls the motion of said motor;

a comparator that produces a dither square wave signal from said signal that controls the motion of said motor;

means for producing first and second digital signals from motion by the gyro, said first digital signal indicating clockwise motion of the gyro and said second digital signal indicating counterclockwise motion of the gyro signal processing comprising means for counting said first and second digital signals to produce a first count within a time period, for defining said time period from said dither square wave signal, for storing said first count as a gain count value and for providing a first gain signal when the magnitude of said gain count value is below a first stored value and providing a second gain signal when the magnitude of said gain count value is above a second stored value; and gain select means for changing the gain of said variable gain amplifier between at least first and second values in response to said first and second gain signals.

2. The gyro described in claim 1, wherein:

said signal processor comprises means for producing an inhibit signal inhibiting a change in the gain of said variable gain amplifier when said motion of the gyro exceeds a selected level based on the characteristics of said first and second digital signals.

3. The gyro described in claim 1, wherein:

said signal processor comprises means for incrementing said gain count value as a function of said first count.

4. The gyro described in claim 1, wherein:

said signal processor comprises means for defining said time period by counting said dither square wave signal.

5. The gyro described in claim 4, wherein:

the first count is reset when the count of said dither square wave signal reaches a predetermined value.

* * * * *